United States Patent
Kawaguchi et al.

(10) Patent No.: US 6,642,300 B1
(45) Date of Patent: Nov. 4, 2003

(54) FILLER FOR CROSSLINKABLE ELASTOMER AND CROSSLINKABLE ELASTOMER COMPOSITION CONTAINING THE SAME

(75) Inventors: Seiji Kawaguchi, Sagamihara (JP); Tsuyoshi Noguchi, Settsu (JP); Takafumi Yamato, Settsu (JP); Mitsuru Kishine, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/959,317

(22) PCT Filed: Apr. 20, 2000

(86) PCT No.: PCT/JP00/02567

§ 371 (c)(1),
(2), (4) Date: Oct. 23, 2001

(87) PCT Pub. No.: WO00/64980

PCT Pub. Date: Nov. 2, 2000

(30) Foreign Application Priority Data

Apr. 23, 1999 (JP) .......................................... 11-117265

(51) Int. Cl.$^7$ .......................... C08L 27/12; C08L 114/18
(52) U.S. Cl. ................. 524/544; 525/326.2; 525/326.5; 427/489; 427/490; 427/491; 427/535; 427/569
(58) Field of Search ....................... 524/544; 525/326.5, 525/326.2; 427/489, 490, 491, 535, 569

(56) References Cited

U.S. PATENT DOCUMENTS

| | | | | | |
|---|---|---|---|---|---|
| 5,272,222 A | * | 12/1993 | Okinoshima et al. | ....... | 525/431 |
| 5,789,025 A | * | 8/1998 | St. Clair | ..................... | 427/245 |

FOREIGN PATENT DOCUMENTS

| | | | | |
|---|---|---|---|---|
| EP | 0 417 778 A1 | * | 3/1991 | |
| EP | 0 626 424 A1 | | 11/1994 | |
| JP | 59-108068 | | 6/1984 | ........... C09D/11/10 |
| JP | 61-281152 | | 12/1986 | ......... C08L/101/00 |
| JP | 3-237150 | | 10/1991 | ........... C08L/61/10 |

* cited by examiner

Primary Examiner—Robert Harlan
(74) Attorney, Agent, or Firm—Sughrue Mion, PLLC

(57) ABSTRACT

To provide the filler which is added to a composition for a sealing member, etc. for sealing of semi-conductor production equipment being apt to be damaged greatly by mixing of a foreign matter and is small in a change in weight in either of the oxygen plasma irradiation and $CF_4$ plasma irradiation, and the crosslinkable elastomer composition. The filler is used for the crosslinkable elastomer and has an imide structure, and a change in weight of the filler is not more than 4 mg/cm$^2$·hr in either of the oxygen plasma irradiation and $CF_4$ plasma irradiation. The crosslinkable elastomer composition comprises the filler and the crosslinkable elastomer such as a fluorine-containing elastomer.

17 Claims, No Drawings

FILLER FOR CROSSLINKABLE ELASTOMER AND CROSSLINKABLE ELASTOMER COMPOSITION CONTAINING THE SAME

TECHNICAL FIELD

The present invention relates to a filler which is small in a change in weight in both of oxygen ($O_2$) plasma treatment and $CF_4$ plasma treatment to be carried out without fail in production process of semi-conductors and can remarkably inhibit generation of foreign matters (micro-particles) in the plasma treatments, and also relates to a crosslinkable elastomer composition containing the filler and to various materials and various final products which are produced from the composition.

BACKGROUND ART

In production of semi-conductors and liquid crystals, various treatments are carried out by using various plasmas such as oxygen plasma and $CF_4$ plasma at the stages of CVD, dry etching, ashing, etc. of silicon wafer. In the treatment equipment employing those plasmas, elastomeric sealing members are used for sealing of various connecting parts and moving parts of the equipment. Those sealing members are required not only to have a sealing property but also as a result of microfabrication and the advent of a large-sized substrate wafer, to stand strict high density plasma treating conditions ($10^{12}$ to $10^{13}/cm^3$) and not to contaminate semi-conductors which require very precise fabrication. To satisfy such requirements, a crosslinkable fluorine-containing elastomer and silicone elastomer are used as elastomeric materials for sealing members.

Since a sufficient mechanical strength cannot be obtained even if only an elastomer is crosslinked, an organic or inorganic filler is usually blended. However even a filler is required to have the above-mentioned properties (neither decomposing nor generating a foreign matter, etc.). It cannot be said that any fillers can be used. Examples of fillers which have been used or proposed are carbon black, silica (Japanese Patent Publication No. 2783576, Japanese Patent Publication No. 2858198), polytetrafluoroethylene (PTFE) powder, titanium oxide powder, clay, talc, barium sulfate, and the like.

However some of those fillers (silica, titanium oxide, etc.) are stable in oxygen plasma treatment but are decomposed to cause a reduction in weight in $CF_4$ plasma treatment, and on the contrary, some of them (carbon black, PTFE powder) are stable in $CF_4$ plasma treatment but are decomposed to cause a reduction in weight in oxygen plasma treatment. If the filler is subject to a change in weight, particularly a reduction in weight by plasma irradiation, it is certain that a reduced portion becomes an unnecessary foreign matter and has any adverse effect on semi-conductors and liquid crystals. Thus the above-mentioned fillers have been proposed. However a state of a change in weight differs depending on kind of the filler and no fillers being stable in the both plasma treatments have been known.

An object of the present invention is to provide a filler which is stable and is very small in a reduction in weight in both of oxygen plasma treatment and $CF_4$ plasma treatment, and a crosslinkable elastomer composition, etc. comprising the filler and a crosslinkable elastomer.

DISCLOSURE OF INVENTION

Namely the present invention relates to the filler for crosslinkable elastomer, in which a change in weight of the filler after either of oxygen plasma irradiation and $CF_4$ plasma irradiation under the conditions of a flow rate of 200 sccm, a pressure of 280 mTorr, a RF output of 400 W and an irradiation time of 54 minutes is not more than 4 $mg/cm^2$ ·hr, preferably not more than 1 $mg/cm^2$ ·hr.

It is preferable that the filler has a thermally and chemically stable aromatic ring on a trunk chain, has heat resistance of not less than 150° C. and particularly comprises a synthetic high molecular compound having an amide bond on a trunk chain or a synthetic high molecular compound having an imide bond on a trunk chain.

A form of the filler of the present invention is not limited particularly. The filler can be used in various forms such as fiber, particle and flake.

Further the present invention relates to the crosslinkable elastomer composition comprising a crosslinkable elastomer and the above-mentioned filler.

It is preferable that the crosslinkable elastomer composition contains the above-mentioned filler in an amount of 1 to 150 parts by weight based on 100 parts by weight of the crosslinkable elastomer and that the crosslinkable elastomer is a fluorine-containing elastomer or a silicone elastomer.

Also the crosslinkable elastomer composition can be used as a crosslinkable elastomer material for molding or a crosslinkable elastomer material for coating.

When the composition is used as the material for molding, it is preferable that the composition contains 1 to 150 parts by weight of the above-mentioned filler and 0.05 to 10 parts by weight of a crosslinking agent based on 100 parts by weight of the crosslinkable elastomer.

When the composition is used as the material for coating, it is preferable that the composition contains 1 to 150 parts by weight of the above-mentioned filler and 0.1 to 10 parts by weight of a crosslinking agent based on 100 parts by weight of the crosslinkable elastomer.

Further the present invention relates to the molded article obtained by crosslinking the crosslinkable elastomer material for molding, particularly to the sealing member for sealing of semi-conductor production equipment.

Also the present invention relates to the coated molded article obtained by applying the crosslinkable elastomer material for coating on a surface of an elastomer molded article and then crosslinking, particularly to the sealing member for sealing of semi-conductor production equipment.

BEST MODE FOR CARRYING OUT THE INVENTION

A change in weight of the filler for crosslinkable elastomer of the present invention after either of oxygen plasma irradiation and $CF_4$ plasma irradiation under the above-mentioned conditions is not more than 4 $mg/cm^2$·hr.

The above-mentioned standard conditions for plasma irradiation are set in consideration of actual treating environment for production of semi-conductors. It is assumed that under those conditions the results reflect an actual situation in the production site of semi-conductors. A change in weight under those irradiation conditions is preferably not more than 1 $mg/cm^2$·hr.

Examples of a substance corresponding to the filler of the present invention are, for instance, imide fillers having an imide structure such as polyimide, polyamideimide and polyetherimide; organic fillers prepared from engineering plastics having heat resistance of not less than 150° C. such as polyarylate, polysulfone, polyether sulfone, polyphenylene sulfide, polyether ether ketone and polyoxy benzoate; and the like.

Among them, preferable are the imide fillers from the viewpoint of heat resistance, a low metal content and a small amount of outgas generation.

Such a filler is blended to the crosslinkable elastomer to give the crosslinkable elastomer composition. A fluorine-containing elastomer and silicone elastomer can be used as the crosslinkable elastomer, and from the viewpoint of heat resistance, the fluorine-containing elastomer is preferable.

The fluorine-containing elastomer which can be used suitably in the present invention is not limited particularly as far as it has been used for sealing members, particularly for sealing members for semi-conductor production equipment. Examples thereof are, for instance,
a copolymer rubber represented by the formula (I):

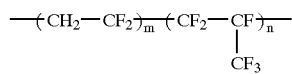

wherein m is 85 to 60, n is 15 to 40, a copolymer rubber represented by the formula (II):

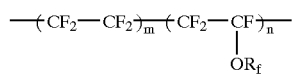

wherein m is 95 to 50, n is 5 to 50, $R_f$ is a perfluoroalkyl group having 1 to 8 carbon atoms, a terpolymer rubber represented by the formula (III):

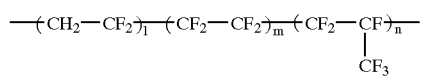

wherein l is 85 to 20, m is 0 to 40, n is 15 to 40, a terpolymer rubber represented by the formula (IV):

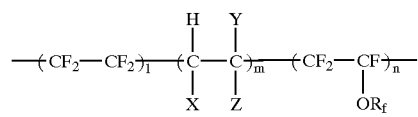

wherein l is 95 to 45, m is 0 to 10, n is 5 to 45, X, Y and Z are fluorine atom or hydrogen atom individually, $R_f$ is a perfluoroalkyl group having 1 to 8 carbon atoms, and a terpolymer rubber represented by the formula (V):

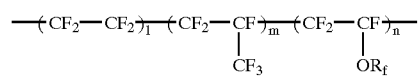

wherein l is 95 to 35, m is 0 to 30, n is 5 to 35, $R_f$ is a perfluoroalkyl group having 1 to 8 carbon atoms. Among them, it is preferable to use the copolymer rubber represented by the formula (I) or (II) or the terpolymer rubber represented by the formula (III) from the viewpoint of chemical resistance, heat resistance and plasma resistance.

Further there are copolymers of an elastomeric segment copolymer with a non-elastomeric segment copolymer as the fluorine-containing rubber for fluorine-containing rubber sealing member of the present invention.

The elastomeric segment is a non-crystalline segment having a glass transition temperature of not more than 25° C. Preferable components thereof are, for example, TFE/PAVE/monomer giving a curing moiety (45 to 90/10 to 50/0 to 5 in % by mole, hereinafter the same), more preferably 45 to 80/20 to 50/0 to 5, particularly 53 to 70/30 to 45/0 to 2.

Examples of the monomer giving a curing moiety are, for instance, vinylidene fluoride, iodine-containing monomers represented by $CX_2=CX-R_f^3CHRI$, wherein X is H, F or $CH_3$, $R_f^3$ is a fluoro alkylene group, perfluoro alkylene group, fluoro polyoxyalkylene group or perfluoro polyoxyalkylene group, R is H or $CH_3$,

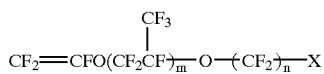

wherein X is CN, COOH or COOR, in which R is an alkyl group of C1 to C10 which may have fluorine atom, m is 0 to 5, n is 1 to 3, bromine-containing monomers, and the like. Usually the iodine-containing monomers are suitable.

Examples of the copolymer which is a non-elastomeric segment are
(1) VdF/TFE (0 to 100/ 100 to 0), particularly VdF/TFE (70 to 99/30 to 1), PTFE or PVdF;
(2) ethylene/TFE/HFP (6 to 43/40 to 81/10 to 30), 3,3,3-trifluoropropylene-1,2-trifluoromethyl-3,3,3-trifluoropropylene-1/PAVE (40 to 60/60 to 40);
(3) TFE/$CF_2=CF-R_f^1$ (amount exhibiting non-elastomeric property, namely, an amount of $CF_2=CF-R_f^1$ is not more than 15% by mole);
(4) VdF/TFE/CTFE (50 to 99/30 to 0/20 to 1);
(5) VdF/TFE/HFP (60 to 99/30 to 0/10 to 1);
(6) ethylene/TFE (30 to 60/70 to 40);
(7) polychlorotrifluoroethylene (PCTFE);
(8) ethylene/CTFE (30 to 60/70 to 40); and the like. Among them, from the viewpoint of chemical resistance and heat resistance, non-elastomeric copolymers, particularly PTFE and TFE/$CF_2=CF-R_f^1$ are preferable.

Examples of the silicone elastomer are, for instance, silicone rubber, fluoro silicone rubber, and the like.

In the crosslinkable elastomer composition, an amount of the filler of the present invention is from 1 to 150 parts by weight, preferably 5 to 100 parts by weight based on 100 parts by weight of the crosslinkable elastomer. When an amount of the filler is small, a mechanical strength is insufficient, and when too large, elongation is inferior.

The crosslinkable elastomer composition containing the filler is useful as a molding material for various molded articles and as a coating material for various elastomer molded articles.

The crosslinkable elastomer material for molding may be prepared by blending 1 to 150 parts by weight, preferably 5 to 100 parts by weight of the filler and 0.05 to 10 parts by weight, preferably 0.5 to 5 parts by weight of the crosslinking agent based on 100 parts by weight of the crosslinkable elastomer.

The crosslinking agent may be optionally selected depending on kind of crosslinkable group (cure site) of the crosslinkable elastomer.

The crosslinking can be carried out by, for example, peroxide crosslinking system, polyol crosslinking system, polyamine crosslinking system, triazine crosslinking system, oxazole crosslinking system, imidazole crosslinking system, thiazole crosslinking system, and the like.

For the peroxide crosslinking, any of known organic peroxides which generate a peroxy radical under vulcanization temperature condition may be used. Examples of the preferable organic peroxide are di-t-butyl peroxide, dicumyl peroxide, 2,5-dimethyl-2,5-di(benzoylperoxy)hexane, 2,5-dimethyl-2, 5-di(t-butylperoxy)hexane, and the like.

Examples of the crosslinking agent for the polyol crosslinking are polyol compounds such as bisphenol A and bisphenol AF.

Examples of the crosslinking agent for the polyamine crosslinking are polyamine compounds such as hexamethylenediamine carbamate, N,N -dicinnamylidene-1,6-hexanediamine, and 4,4-bis(aminocyclohexyl)methane carbamate.

Examples of the crosslinking agent for the triazine crosslinking are organotin compounds such as tetraphenyltin and triphenyltin.

Examples of the crosslinking agent which is used in oxazole crosslinking system, imidazole crosslinking system and thiazole crosslinking system are, for instance, bisdiaminophenyl crosslinking agent represented by the formula (VI):

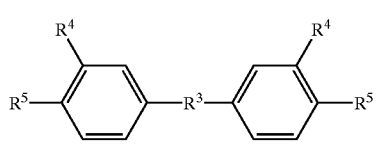

wherein $R^3$ is $-SO_2-$, $-O-$, $-CO-$, an alkylene group having 1 to 6 carbon atoms, a perfluoroalkylene group having 1 to 10 carbon atoms or a single bond, one of $R^4$ and $R^5$ is $-NH_2$ and another one is $-NH2$, $-OH$ or $-SH$ and preferably each of $R^4$ and $R^5$ is $-NH_2$, bisaminophenol crosslinking agent, bisaminothiophenol crosslinking agent, bisamidrazone crosslinking agent represented by the formula (VII):

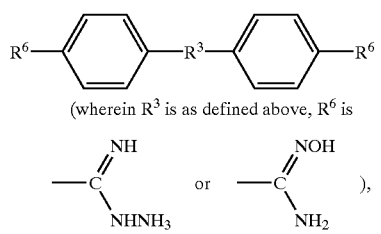

(wherein $R^3$ is as defined above, $R^6$ is $$-C\overset{NH}{\underset{NHNH_3}{\diagdown}} \quad or \quad -C\overset{NOH}{\underset{NH_2}{\diagdown}}),$$

bisamidoxime crosslinking agent represented by the formula (VIII) or (IX):

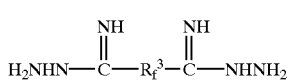

wherein $R_f^3$ is a perfluoroalkylene group having 1 to 10 carbon atoms,

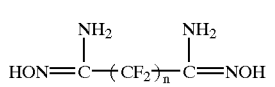

wherein n is an integer of 1 to 10, and the like. Those bisaminophenol crosslinking agent, bisaminothiophenol crosslinking agent and bisdiaminophenyl crosslinking agent have been used for a crosslinking system employing nitrile group as a crosslinking point, but are also reacted with carboxyl group or alkoxycarbonyl group to form an oxazole ring, thiazole ring or imidazole ring and give a crosslinked article.

Particularly preferable crosslinking agents are compounds having a plurality of 3-amino-4-hydroxyphenyl groups, 3-amino-4-mercaptophenyl groups or 3,4-diaminophenyl groups represented by the formula:

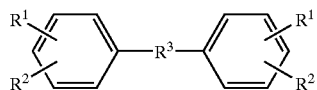

wherein $R^3$ is as defined above, R1 and R2 are the same as the above-mentioned $R^4$ and R5. Examples thereof are, for instance, (3-amino-4-hydroxyphenyl)hexafluoropropane (general term: bis(aminophenol) AF), 2,2-bis(3-amino-4-mercaptophenyl)hexafluoropropane, tetraamino benzene, bis-3,4-diaminophenylmethane, bis-3,4-diaminophenylether, 2,2-bis(3,4-diaminophenyl)hexafluoropropane, and the like.

An amount of the crosslinking agent is usually from 0.05 to 10 parts by weight, preferably 1 to 5 parts by weight based on 100 parts by weight of the crosslinkable elastomer. When less than 0.05 part by weight, the crosslinkable elastomer is not crosslinked sufficiently, and when more than 10 parts by weight, physical properties of crosslinked article are lowered.

When the crosslinkable elastomer composition of the present invention is used, particularly as a material for coating, a crosslinking aid such as a multi-functional co-crosslinking agent can be used. Examples of the multi-functional co-crosslinking agent are, for instance, bisolefins represented by triallylcyanurate, trimethallyl isocyanurate, triallyl isocyanurate, triacryl formal, triallyl trimellitate, N,N'-m-phenylenebismaleimide, diallyl phthalate, tetraallyl terephthalamide, tris(diallylamine)-S-triazine, triallyl phosphite, and N,N-diallyl acrylamide, 1,6-divinyldodecafluorohexane, and the like.

An adding amount of the crosslinking aid is usually from 0.1 to 10 parts by weight, preferably 0.5 to 5 parts by weight based on 100 parts by weight of the crosslinkable elastomer.

When the content of the crosslinking aid is less than 0.1 part by weight, the crosslinkable elastomer is not crosslinked sufficiently, and when more than 10 parts by weight, elongation of the crosslinked article is lowered.

To the composition of the present invention can be added as case demands, additives which are usually added to a crosslinkable elastomer composition, for example, a filler, processing aid, plasticizer, coloring agent, and the like in a field where high purity and non-contaminating property are not required particularly. In addition to the above-mentioned additives, one or more of usual crosslinking agents and crosslinking aids other than the above-mentioned ones may be blended.

The composition and materials for molding and coating of the present invention can be prepared by mixing each of the above-mentioned components by using usual processing equipment for elastomer, for example, an open roll, Banbury mixer, kneader, or the like. In addition, the composition and the materials can be prepared also by a method of using a closed mixer and a method of co-coagulation through emulsion mixing.

For producing a pre-molded article from the above-mentioned composition and materials, usual known methods may be employed, such as a method of heating and compressing in a metal mold, a method of putting in a heated metal mold under pressure or a method of extruding with an extruder. In cases of extruded products such as a hose and cable, since shapes thereof can be maintained even after the extruding, a pre-molded article extruded without using a crosslinking agent can be used as it is. Of course, it is possible to use a pre-molded article subjected to crosslinking by heating with steam and using a crosslinking agent. Also in case of a shaped product such as O-ring, when it is difficult to hold a shape of the product in an un-crosslinked state after mold-releasing, it is possible to maintain the shape by using a pre-molded article crosslinked previously by using a crosslinking agent.

When carrying out peroxide crosslinking, the crosslinking can be carried out under usual crosslinking conditions for crosslinkable elastomers. For example, a crosslinked article can be obtained by putting a crosslinkable elastomer in a metal mold, carrying out press-crosslinking by holding under pressure at 120° to 200° C. for 1 to 60 minutes and then crosslinking in an oven by holding at 120° to 250° C. for 0 to 48 hours.

In the present invention when carrying out oxazole crosslinking by using a crosslinking agent such as bisaminophenol, the crosslinking can be carried out under usual crosslinking conditions for crosslinkable elastomers. For example, a crosslinked article can be obtained by putting a crosslinkable elastomer in a metal mold, carrying out press-crosslinking by holding under pressure at 120° to 250° C. for 1 to 60 minutes and then crosslinking in an oven by holding at 120° to 320° C. for 0 to 48 hours. Also to formulations of known crosslinking methods for crosslinkable elastomer such as polyamine crosslinking, polyol crosslinking and peroxide crosslinking, a crosslinking agent such as bis(aminophenol) AF is co-used to crosslink the elastomer.

Also imidazole crosslinking in which carboxyl group is crosslinked with bisdiaminophenyl crosslinking agent is optimum for a polymer containing carboxyl group at other point than end thereof, and gives a crosslinked article having good physical properties at a relatively low crosslinking temperature (for example, 150° to 230° C., preferably 1700 to 200° C.).

In case of applications such as semi-conductor production equipment where non-contaminating property is strongly demanded, it is preferable to carry out crosslinking with a high energy ray without using a crosslinking agent. Examples of crosslinking source to be used are radiant rays such as α-ray, , β-ray, γ-ray and X-ray, electron beam, ultraviolet ray, and the like.

A quantity of radiation of high energy ray to be irradiated to the pre-molded article is, for example, in case of electron beam, preferably from 5 to 500 kGy, more preferably 10 to 300 kGy. When less than 5 kGy, an improvement in mechanical strength by irradiation of the electron beam is insufficient. When more than 500 kGy, deterioration of the elastomer advances and a part of bonds between the molecules is cut, thereby lowering a mechanical strength of the molded article. In order to increase the mechanical strength, a radiation rate is preferably not less than 500 kGy/hr, more preferably 1,000 kGy/hr or more.

The present invention relates to the molded article obtained by crosslinking the above-mentioned composition or molding materials. Further the present invention relates to the coated molded article obtained by applying the above-mentioned material for coating on an elastomer molded article and then crosslinking.

Though articles made of various elastomer materials can be used as the elastomer molded article to be coated, preferable are fluorine-containing elastomers and silicone elastomers particularly from the viewpoint of heat resistance.

The molded article and coated molded article of the present invention are useful as various molded articles in the fields shown in Tables 1, 2 and 3 on the following pages.

TABLE 1

| Field of industry | Sub-field of industry | Final product | Equipment | Parts |
| --- | --- | --- | --- | --- |
| Electrical | Semi-conductor | Semi-conductor production apparatus Liquid crystal panel production apparatus Plasma panel production apparatus | CVD equipment Dry etching equipment Wet etching equipment Oxidation and diffusion equipment Sputtering equipment Ashing equipment Cleaning equipment Ion implantation equipment | O (square) ring, packing, sealing material, tube, roll Coating, lining, gasket, diaphragm, hose |
| Transportation | Vehicle | Car | Engine and auxiliary equipment | Gasket, shaft seal, valve stem seal, sealing material, hose |
| | | | AT | Hose, sealing material |
| | | | Fuel line and auxiliary equipment | O (square) ring, tube, packing, core material of valve, hose, sealing material, diaphragm |
| | Aircraft | Aircraft | Fuel line | Diaphragm, O (square) ring, valve, tube, packing, hose, sealing material |
| | Rocket | Rocket | Fuel line | Diaphragm, O (square) ring, valve, tube, packing, hose, sealing material |
| | Ship | Ship | Fuel line | Diaphragm, O (square) ring, valve, tube, packing, hose, sealing material |
| Chemical | Chemical products | Plant | Production line of chemicals such as pharmaceutical, agricultural chemical, coating and resin (Petroleum) | Lining, valve, packing, roll, hose, diaphragm, O (square) ring, tube, sealing material |
| | Chemicals | Pharmaceuticals | Plug for chemicals | Plug for chemicals |
| Mechanical | Photograph | Developing machine | Film developing machine | Roll |
| | | | X-ray film developing machine | Roll |
| | Printing | Printing machine | Printing roll | Roll |
| | Coating | Coating facilities | Coating roll | Roll |

TABLE 1-continued

| Field of industry | Sub-field of industry | Final product | Equipment | Parts |
|---|---|---|---|---|
| | Analyzer and physical and chemical appliances | | | Tube |
| Food | Plant | | Food processing line | Lining, valve, packing, roll, hose, diaphragm, O (square) ring, tube, sealing material |
| Metal | Steel making | Steel sheet processing facilities | Steel sheet processing roll | Roll |

TABLE 2

| Field of Industry | Characteristics Required |
|---|---|
| Electrical | Plasma resistance, acid resistance, alkali resistance, amine resistance, ozone resistance, gas resistance, chemical resistance, cleanliness, heat resistance |
| Transportation | Heat resistance, amine resistance |
| | Heat resistance, amine resistance |
| | Fuel resistance, fuel permeability, heat resistance |
| | Fuel resistance, fuel permeability, heat resistance |
| | Fuel resistance, fuel permeability, heat resistance |
| | Fuel resistance, fuel permeability, heat resistance |
| Chemical | Chemical resistance, solvent resistance, heat resistance |
| | Chemical resistance, solvent resistance, heat resistance |
| | Cleanliness |
| Mechanical | Chemical resistance |
| | Chemical resistance |
| | Solvent resistance |
| | Solvent resistance |
| Food | Chemical resistance, solvent resistance, heat resistance |
| Metal | Heat resistance, acid resistance |

TABLE 3

| Field of Industry | Parts |
|---|---|
| Electrical | O ring and sealing material for gate valve of corresponding product or equipment |
| | O ring and sealing material for quartz window of corresponding product or equipment |
| | O ring and sealing material for chamber of corresponding product or equipment |
| | O ring and sealing material for gate of corresponding product or equipment |
| | O ring and sealing material for bell jar of corresponding product or equipment |
| | O ring and sealing material for coupling of corresponding product or equipment |
| | O ring and sealing material for pump of corresponding product or equipment |
| | O ring and sealing material for gas controller for semi-conductor of corresponding product or equipment |
| | O ring and sealing material for resist developing and releasing solutions |
| | O ring and sealing material for wafer cleaning solution |
| | Diaphragm of pump for corresponding production equipment |
| | Hose for resist developing and releasing solutions |
| | Hose and tube for wafer cleaning solution |
| | Roll for transferring wafer |
| | Lining and coating of tanks for resist developing and releasing solutions |
| | Lining and coating of tanks for wafer cleaning solution |
| | Lining and coating of tanks for wet etching |
| Transportation | Engine head gasket |
| | Metal gasket |
| | Crank shaft seal |
| | Cam shaft seal |
| | Valve stem seal |
| | Manifold packing |

TABLE 3-continued

| Field of Industry | Parts |
|---|---|
| | Oil hose |
| | ATF hose |
| | Injector O ring |
| | Injector packing |
| | O ring and diaphragm for fuel pump |
| | Fuel hose |
| Chemical | |
| Mechanical | Developing roll |
| | Developing roll |
| | Gravure roll |
| | Guide roll |
| | Gravure roll for magnetic tape production and coating line |
| | Guide roll for magnetic tape production and coating line |
| | Various coating rolls |
| Food | |
| Metal | |

Particularly the molded articles of the present invention can be used built-in the following semiconductor manufacturing equipment.

1) Etching system
   Dry etching equipment
      Plasma etching machine
      Reactive ion etching machine
      Reactive ion beam etching machine
      Sputter etching machine
      Ion beam etching machine
   Wet etching equipment
   Ashing equipment (2) Cleaning system
   Dry etching cleaning equipment
      UV/$O_3$ cleaning machine
      Ion beam cleaning machine
      Laser beam cleaning machine
      Plasma cleaning machine
      Gas etching cleaning machine
   Extractive cleaning equipment
      Soxhlet extractive cleaning machine
      High temperature high pressure extractive cleaning machine
      Microwave extractive cleaning machine
      Supercritical extractive cleaning machine (3) Exposing system
   Stepper
   Coater and developer (4) Polishing system
   CMP equipment (5) Film forming system
   CVD equipment
   Sputtering equipment (6) Diffusion and ion implantation system
   Oxidation and diffusion equipment
   Ion implantation equipment Among them, the molded articles of the present invention exhibit excellent performance as sealing members particularly for CVD equipment, plasma etching equipment, reactive ion etching equipment, ashing equipment and excimer laser exposing equipment.

The present invention is then explained by means of examples, but is not limited to them.

EXAMPLE 1

A polyimide film was put in a demonstration dish made of glass and heated in nitrogen atmosphere at 150° C. for 60 minutes to make a sample.

The sample was subjected to treating by plasma irradiation under the following conditions, and a weight of the sample before and after the irradiation was measured to determine a change in weight. The results are shown in Table 4.

Machine Used for Irradiation of Plasma:
   PX-1000 available from March Instruments Co., Ltd.
Conditions for irradiation:
   Irradiation of oxygen plasma
      Gas flow: 200 sccm
      RF output: 400 W
      Pressure: 280 mTorr
      Etching time: 54 minutes
   Irradiation of $CF_4$ plasma
      Gas flow: 200 sccm
      RF output: 400 W
      Pressure: 280 mTorr
      Etching time: 54 minutes Irradiation Step:

In order to stabilize an atmosphere in a chamber of plasma irradiation machine, actual gas discharging is carried out for 5 minutes for pre-treatment of the chamber without using a sample. Then a demonstration dish with the sample is arranged at a center between the RF electrodes and the irradiation is carried out under the above-mentioned conditions.

Measurement of weight:

A weight of the sample is measured up to the place of 0.01 mg by using an electronic balance 2006MPE available from Sartorius GMBH and then rounded to one decimal.

Three samples are used for each kind and evaluation is made with an average thereof.

COMPARATIVE EXAMPLE 1

Plasma irradiation and determination of a change in weight after the irradiation were carried out in the same manner as in Example 1 except that a graphitized carbon black (#3885 available from Tokai Carbon Co., Ltd., average particle size: 15 μm) was used as a filler. The results are shown in Table 4.

COMPARATIVE EXAMPLE 2

Plasma irradiation and determination of a change in weight after the irradiation were carried out in the same manner as in Example 1 except that a polytetrafluoroethylene powder (LUBRON L5F available from DAIKIN INDUSTRIES, LTD., average particle size: 5 μm) was used as a filler. The results are shown in Table 4.

COMPARATIVE EXAMPLE 3

Plasma irradiation and determination of a change in weight after the irradiation were carried out in the same manner as in Example 1 except that a rutile titanium oxide powder (TM-1 available from FUJI TITANIUM KABUSHIKI KAISHA, average particle size: 0.40 μm) was used as a filler. The results are shown in Table 4.

COMPARATIVE EXAMPLE 4

Plasma irradiation and determination of a change in weight after the irradiation were carried out in the same manner as in Example 20 1 except that a dry silica (1-FX available from KABUSHIKI KAISHA TATSUMORI, average particle size: 0.38 μm) was used as a filler. The results are shown in Table 4.

TABLE 4

| | | Oxygen plasma irradiation treatment | | | | $CF_4$ plasma irradiation treatment | | | |
|---|---|---|---|---|---|---|---|---|---|
| | Irradiation area (cm²) | Before irradiation (g) | After irradiation (g) | Difference in weight (g) | Change in weight (mg/cm² · hr) | Before irradiation (g) | After irradiation (g) | Difference in weight (g) | Change in weight (mg/cm² · hr) |
| Ex. 1 | 18.1 | 16.0001 | 15.9968 | −0.0033 | −0.3646 | 16.0019 | 16.0002 | −0.0017 | −0.1878 |
| Com. Ex. 1 | 18.1 | 20.1771 | 20.0131 | −0.1640 | −10.0675 | 20.0009 | 20.0414 | 0.0405 | 2.4862 |
| Com. Ex. 2 | 14.5 | 17.2739 | 17.1441 | −0.1298 | −9.9464 | 17.1397 | 17.1392 | −0.0005 | −0.0383 |
| Com. Ex. 3 | 14.5 | 18.5366 | 18.5378 | 0.0012 | 0.0920 | 18.5364 | 18.4721 | −0.0643 | −4.9272 |
| Com. Ex. 4 | 14.5 | 16.4553 | 16.4565 | 0.0012 | 0.0920 | 16.4548 | 16.3998 | −0.0550 | −4.2146 |

As it is clear from Table 4, in cases of the carbon black (Comparative Example 1) and the polytetrafluoroethylene powder (Comparative Example 2), a weight of the filler was reduced greatly by the oxygen plasma irradiation, and in cases of the titanium oxide powder (Comparative Example 3) and the dry silica (Comparative Example 4), a weight of the filler was reduced greatly by the $CF_4$ plasma irradiation. In the $CF_4$ plasma irradiation of Comparative Example 1, there was an increase in a weight. It can be considered that this was caused because a part of the carbon black was fluorinated by the $CF_4$ plasma irradiation. On the contrary, in case of the filler of the present invention, it can be seen that in either of the oxygen plasma irradiation and $CF_4$ plasma irradiation, a weight of the filler is very stable.

INDUSTRIAL APPLICABILITY

According to the present invention, since a change in weight of the filler is small in either of the oxygen plasma irradiation and $CF_4$ plasma irradiation, when the filler is added to a crosslinkable elastomer, it is possible to provide a composition for a sealing member, etc. for sealing of semi-conductor production equipment which is apt to be damaged greatly by mixing of a foreign matter and a molded article such as a sealing member.

What is claimed is:

1. A filler for crosslinkable elastomer, in which a change in weight of the filler after either of oxygen plasma irradiation and $CF_4$ plasma irradiation under the conditions of a flow rate of 200 sccm, a pressure of 280 mTorr, a RF output of 400 W and an irradiation time of 54 minutes is not more than 4 mg/cm$^2$·hr.

2. The filler of claim 1, wherein the change in weight is not more than 1 mg/cm$^2$·hr.

3. The filler of claim 1, which has a thermally and chemically stable aromatic ring on a trunk chain and has heat resistance of not less than 150° C.

4. The filler of claim 1, which comprises a synthetic high molecular compound having an amide bond on a trunk chain or a synthetic high molecular compound having an imide bond on a trunk chain.

5. A crosslinkable elastomer composition comprising a crosslinkable elastomer and the filler of claim 1.

6. The crosslinkable elastomer composition of claim 5, which contains 1 to 150 parts by weight of the filler based on 100 parts by weight of the crosslinkable elastomer.

7. The crosslinkable elastomer composition of claim 5, wherein the crosslinkable elastomer is a fluorine-containing elastomer or a silicone elastomer.

8. A crosslinkable elastomer material for molding, which comprises the crosslinkable elastomer composition of claim 5.

9. The crosslinkable elastomer material for molding of claim 8, which contains 1 to 150 parts by weight of the filler and 0.05 to 10 parts by weight of a crosslinking agent based on 100 parts by weight of the crosslinkable elastomer.

10. The crosslinkable elastomer material for molding of claim 8, wherein the crosslinkable elastomer is a fluorine-containing elastomer or a silicone elastomer.

11. A molded article obtained by crosslinking the crosslinkable elastomer material for molding of claim 8.

12. The molded article of claim 11, which is a sealing member for sealing of semi-conductor production equipment.

13. A crosslinkable elastomer material for coating, which comprises the crosslinkable elastomer composition of claim 5.

14. The crosslinkable elastomer material for coating of claim 13, which contains 1 to 150 parts by weight of the filler and 0.1 to 10 parts by weight of a crosslinking agent based on 100 parts by weight of the crosslinkable elastomer.

15. The crosslinkable elastomer material for coating of claim 13, wherein the crosslinkable elastomer is a fluorine-containing elastomer or a silicone elastomer.

16. A coated molded article obtained by applying the crosslinkable elastomer material for coating of claim 13 on a surface of an elastomer molded article and carrying out crosslinking.

17. The coated molded article of claim 16, which is a sealing member for sealing of semi-conductor production equipment.

* * * * *